Sept. 6, 1938. C. H. STEENSTRUP 2,129,539
GUIDE AND STOP FOR REFRIGERATORS
Filed Nov. 11, 1936
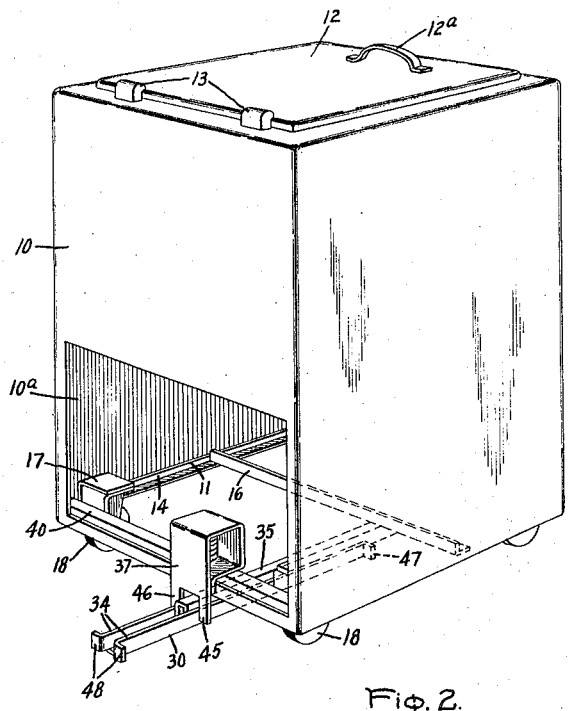
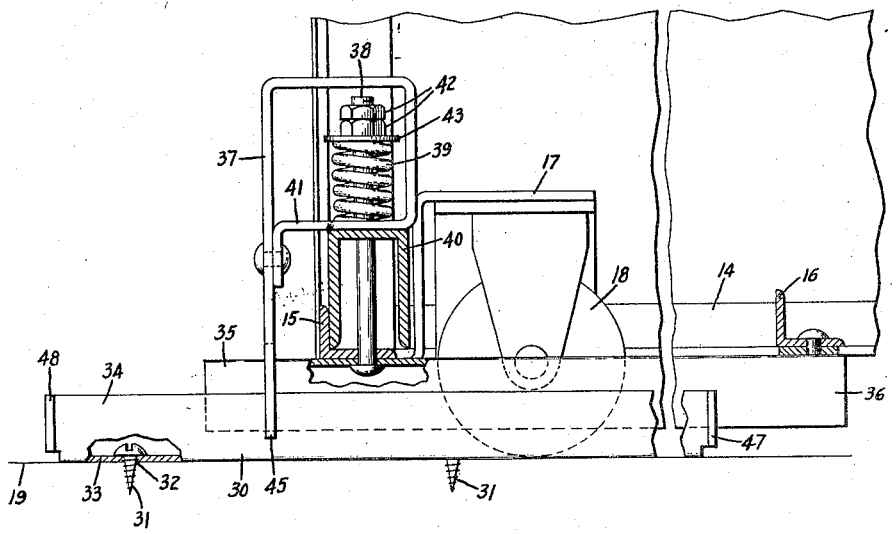
Inventor:
Carl H. Steenstrup,
by Harry E. Dunham
His Attorney.

Patented Sept. 6, 1938

2,129,539

UNITED STATES PATENT OFFICE 2,129,539

GUIDE AND STOP FOR REFRIGERATORS

Carl H. Steenstrup, Schenectady, N. Y., assignor to General Electric Company, a corporation of New York Application November 11, 1936, Serial No. 110,323

4 Claims. (Cl. 104—247)

My invention relates to refrigerator cabinets and more particularly to a guide and stop arrangement therefor.

In order to render a kitchen as convenient as possible to the user, it is desirable that an economical use be made of the space in the kitchen and that the kitchen equipment employed therein be arranged in a compact manner. One arrangement for economically using the space in the kitchen may be had by employing a refrigerator cabinet of such height that it may be placed under a kitchen sink when it is not in use. Preferably, the refrigerator cabinet is provided with a door in the top wall thereof to render a food storage compartment therein readily accessible, and is mounted on a plurality of supporting rollers for facilitating movement thereof. When the user desires access to the food storage compartment of the refrigerator cabinet, the refrigerator cabinet is rolled out from under the sink. When the refrigerator cabinet is not in use it is rolled back under the sink, thus providing a maximum amount of clear floor space in the kitchen and a compact arrangement of the kitchen equipment. In view of the fact that the refrigerator cabinet is moved out into a position in the kitchen and returned to a position under the sink many times during the course of a day by the user, it is desirable that a guiding arrangement be provided for the refrigerator cabinet in order to define a path of travel for the same. Also, it is desirable that some stop arrangement be provided to prevent over-travel of the refrigerator cabinet in its path of travel.

It is an object of my invention to provide an improved arrangement for guiding a refrigerator cabinet in a path of travel and for limiting the movement of the refrigerator cabinet at each end of its path of travel.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a perspective view of a refrigerator cabinet provided with an arrangement embodying my invention for guiding the same in a path of travel and for limiting the movement of the same at each end of its path of travel; and Fig. 2 is an enlarged side elevational view, partly in section, of the guiding and movement limiting arrangement shown in Fig. 1.

Referring to the drawing, I have shown in Fig. 1 a refrigerator cabinet provided with a sheet metal outer shell 10 mounted on a supporting frame 11 of rectangular configuration. The refrigerator cabinet is provided with a heat insulated food storage compartment in the upper portion thereof having a door opening in its top wall in registry with a door opening provided in the top wall of the outer shell 10. This door opening is closed by a suitable heat insulated door 12 hinged adjacent the door opening upon hinges 13 secured to the top wall of the outer shell 10. Access may be had to the food storage compartment by swinging the door 12 upwardly by its handle 12a about its hinges 13. An opening 10a is formed in the outer shell 10 in the rear wall of the refrigerator cabinet to afford access to a machinery compartment formed in the lower portion thereof.

The rectangular supporting frame 11 comprises spaced apart side and end members 14 and 15, respectively, formed of angle iron, and secured together. Intermediate the ends of the side members 14 and substantially parallel to the end members 15 there is secured a brace member 16 formed of angle iron. Four supporting brackets 17 are provided having rollers 18 mounted thereon, one of these brackets being rigidly attached to each corner of the rectangular frame 11. The rollers 18 support the refrigerator cabinet on the floor 19 or other support, so that the refrigerator cabinet can be conveniently moved back and forth on the floor or support and from its position beneath a kitchen sink.

An arrangement is provided for guiding the refrigerator cabinet in a path of travel and for limiting the movement of the refrigerator cabinet at either end of its path of travel including a channel shaped guide member or rail 30 rigidly secured to the surface of the floor 19 by a series of screws 31 passing through openings 32 formed in the web portion 33 of the guide rail. The guide rail 30 has two substantially parallel upstanding edges 34 which are integral with the web portion 33. A complementary channel shaped guide member 35 having downwardly extending edges 36 extends between the end member 15 at the rear of the supporting frame 11 and the brace member 16, and is secured thereto. The downwardly extending edges 36 of the guide member 35 are received between the upstanding edges 34 of the guide rail 30 and cooperate therewith to define a path of travel for the refrigerator cabinet having an axis extending from the front to the rear thereof. A stop member 37 is resiliently secured to the rear of the supporting frame 11 by an arrangement including a bolt 38 and a compression spring 39. The bolt 38 is passed through an opening formed in the web portion of the supporting member 36, an opening formed in the rear end member 15, an opening formed in the web portion of an inverted channel member 40 attached to the frame and an enlarged opening formed in the horizontal portion 41 of the stop member 37. The compression spring 39 is arranged on the upper end of the bolt 38 and is secured under compression by the nuts 42 and washer 43. The stop member 37 is bifurcated at its lower end, providing legs 45 and 46 disposed in spaced relationship and embracing the upstanding edges 34 of the guide rail 30. At each end of the guide rail 30 the upstanding edges 34 are bent outwardly in opposite directions to provide spaced apart stops 47 and 48 at the front and rear ends, respectively, of the guide rail.

When the refrigerator cabinet is pulled in a direction along the axis of the guide rail 30, the refrigerator cabinet is rolled along the floor 19 on the rollers 18 secured to the brackets 17, and is guided in a path of travel by the cooperation between the guide member 35 secured to the refrigerator cabinet and the guide rail 30 secured to the floor. The guide rail 30 is secured to the floor of the kitchen in such a position with respect to the kitchen sink therein that the path of travel of the refrigerator cabinet extends from under the kitchen sink to a position in the kitchen. When access to the food storage compartment of the refrigerator cabinet is desired, the refrigerator cabinet is rolled from under the kitchen sink to a position in the kitchen allowing the compartment door 12 to be raised. When the refrigerator cabinet is not in use it is rolled back under the kitchen sink.

The refrigerator cabinet may be moved freely towards the front end of the guide rail 30 until the legs 45 and 46 on the stop member 37 engage the outwardly extending stops 47 provided at the front end of the guide rail 30. The refrigerator cabinet then continues to move forward a short distance which causes the stop member 37 to be swung or pivoted slightly in a clockwise direction with respect to the web portion of the inverted channel 40, thus compressing the spring 39 and causing the refrigerator cabinet to be stopped by a cushioning action. In a like manner the refrigerator cabinet may be moved freely towards the rear end of the guide rail 30 until the legs 45 and 46 on the stop member 37 engage the outwardly extending stops 48 at the rear end of the guide rail 30. The refrigerator cabinet then continues to move rearward a short distance which causes the stop member 37 to be swung or pivoted slightly in a counter-clockwise direction with respect to the web portion of the inverted channel 40, thus compressing the spring 39 and causing the refrigerator cabinet to be stopped by a cushioning action. Thus the compression spring 39 dampens the impact of the cabinet stop 37 with the stationary stops 47 and 48 and tends to limit resiliently the pivotal or swinging movement of the stop 37 about the pivotal securing bolt 38. Articles placed in the food storage compartment of the refrigerator cabinet are not disturbed or upset when the refrigerator cabinet is stopped at either end of its path of travel due to the cushioning action of the limiting arrangement described above. It will thus be seen that I have provided an arrangement for guiding a refrigerator cabinet in a path of travel and for limiting the movement of the refrigerator cabinet at each end of its path of travel.

Although I have shown a particular embodiment of my invention, I do not desire my invention to be limited thereto and I intend in the appended claims to cover all modifications within the spirit and scope of my invention.

What I claim as new and desire to secure by Letters Patent of the United States, is:

1. In combination with a cabinet having a mounting providing for movement thereof, a support for said cabinet, a guide rail carried by said cabinet, a second guide rail carried by said support and cooperating with said first-mentioned guide rail to define a path of travel for said cabinet, spaced apart stops on said second guide rail, and means including a stop member pivotally carried by said cabinet and adapted to engage said spaced apart stops for limiting the movement of said cabinet at each end of its path of travel.

2. In combination with a cabinet having a mounting providing for movement thereof, a support for said cabinet, a guide member carried by said cabinet, a guide rail having a pair of upstanding substantially parallel spaced edges secured to said support, said guide member being received between said upstanding edges of said guide rail and cooperating therewith to define a path of travel for said cabinet, spaced apart stops on each end of said upstanding edges of said guide rail, and means including a bifurcated member resiliently secured to said refrigerator cabinet and having legs cooperating with said spaced apart stops for limiting the movement of said cabinet at each end of its path of travel.

3. In combination with a cabinet having a frame, a plurality of supporting rollers secured to said frame providing for movement of said cabinet, a support for said cabinet, a guide member carried by said frame, a guide rail carried by said support and cooperating with said guide member to define a path of travel for said cabinet, spaced apart stops on said guide rail, means including a member pivotally secured to said frame and cooperating with said spaced apart stops for limiting the movement of said cabinet at each end of its path of travel, and means for resiliently limiting the pivotal movement of said pivotally secured member.

4. In combination with a cabinet having a frame, a plurality of supporting rollers secured to said frame providing for movement of said cabinet, a support for said cabinet, a channel shaped guide member having downwardly extending edges secured to said frame, a channel shaped guide rail having upstanding edges secured to said support, said downwardly extending edges of said guide member being received between said upstanding edges of said guide rail and cooperating therewith to define a path of travel for said cabinet, said upstanding edges of said guide rail being bent outwardly at each end of said guide rail forming spaced apart stops, and a stop member having legs disposed on each side of said channel shaped guide rail and secured to said frame by means including a resilient spring, said stop member cooperating with said spaced apart stops to limit the movement of said cabinet at each end of its path of travel.

CARL H. STEENSTRUP.